(12) United States Patent
Shaviv et al.

(10) Patent No.: US 12,197,668 B2
(45) Date of Patent: Jan. 14, 2025

(54) SYSTEMS AND METHODS FOR TOUCH SENSING ON DEVICES INCLUDING REGIONS WITH AND WITHOUT TOUCH ELECTRODES

(71) Applicant: Apple Inc., Cupertino, CA (US)

(72) Inventors: Dor Shaviv, Fremont, CA (US); Behrooz Shahsavari, Hayward, CA (US); David S. Graff, San Francisco, CA (US); Baboo V. Gowreesunker, Mountain View, CA (US); Nima Ferdosi, San Jose, CA (US); Yash S. Agarwal, San Francisco, CA (US); Sai Zhang, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/450,771

(22) Filed: Aug. 16, 2023

(65) Prior Publication Data

US 2024/0077965 A1 Mar. 7, 2024

Related U.S. Application Data

(60) Provisional application No. 63/374,744, filed on Sep. 6, 2022.

(51) Int. Cl.
*G06F 3/041* (2006.01)
(52) U.S. Cl.
CPC ........ *G06F 3/0412* (2013.01); *G06F 3/04186* (2019.05); *G06F 2203/04101* (2013.01)

(58) Field of Classification Search
CPC .. G06F 3/0412; G06F 3/04186; G06F 3/0416; G06F 3/044; G06F 2203/04101; G06N 20/00

See application file for complete search history.

(56) References Cited

U.S. PATENT DOCUMENTS

| | | | |
|---|---|---|---|
| 8,970,515 B2 | 3/2015 | Moran et al. | |
| 9,753,579 B2 | 9/2017 | Johansson et al. | |
| 9,851,605 B2 | 12/2017 | Watanabe et al. | |
| 9,904,432 B2 | 2/2018 | Choi et al. | |
| 10,078,406 B2 | 9/2018 | Tanemura et al. | |
| 10,884,305 B2 | 1/2021 | Yoshida | |

(Continued)

FOREIGN PATENT DOCUMENTS

| | | |
|---|---|---|
| EP | 3125084 B1 | 8/2020 |
| WO | 2007/017485 A2 | 2/2007 |
| WO | 2019/148603 A1 | 8/2019 |

OTHER PUBLICATIONS

Final Office Action received for U.S. Appl. No. 18/174,425, mailed on Jun. 21, 2024, 12 pages.

(Continued)

*Primary Examiner* — Christopher E Leiby
(74) *Attorney, Agent, or Firm* — Kubota & Basol LLP

(57) ABSTRACT

Touch sensor panels/screens can include a first region having a plurality of touch electrodes and a second region without touch electrodes. In some examples, to improve touch sensing performance, a first algorithm or a second algorithm is applied to determine whether an object corresponding to the touch patch is in contact with the touch screen. Whether to apply the first algorithm or the second algorithm is optionally dependent on the location of the touch patch.

24 Claims, 11 Drawing Sheets

(56) References Cited

U.S. PATENT DOCUMENTS

| | | |
|---|---|---|
| 10,910,461 B2 | 2/2021 | Lee et al. |
| 10,916,595 B2 | 2/2021 | Park et al. |
| 10,983,652 B2 | 4/2021 | Jung et al. |
| 11,057,554 B2 | 7/2021 | Nakamura et al. |
| 11,158,238 B2 | 10/2021 | Yamashita et al. |
| 11,281,035 B2 | 3/2022 | Jung et al. |
| 11,442,587 B2 | 9/2022 | Song et al. |
| 11,587,991 B2 | 2/2023 | Han et al. |
| 11,604,553 B2 | 3/2023 | Song et al. |
| 2011/0050624 A1 | 3/2011 | Lee et al. |
| 2013/0268900 A1 | 10/2013 | Ferren et al. |
| 2017/0154566 A1 | 6/2017 | Ryoo et al. |
| 2017/0162637 A1 | 6/2017 | Choi et al. |
| 2017/0227804 A1 | 8/2017 | Nagasawa et al. |
| 2017/0235398 A1 | 8/2017 | Choi et al. |
| 2017/0351131 A1 | 12/2017 | Oem et al. |
| 2018/0129111 A1 | 5/2018 | Wu et al. |
| 2018/0157362 A1 | 6/2018 | Kim et al. |
| 2018/0366495 A1 | 12/2018 | Xu et al. |
| 2019/0051670 A1 | 2/2019 | Bei et al. |
| 2019/0123066 A1 | 4/2019 | Zhan et al. |
| 2019/0197949 A1 | 6/2019 | Kim et al. |
| 2019/0362678 A1 | 11/2019 | Shin et al. |
| 2020/0044006 A1 | 2/2020 | Lee et al. |
| 2020/0110298 A1 | 4/2020 | Li et al. |
| 2020/0117034 A1 | 4/2020 | Yin et al. |
| 2020/0127231 A1 | 4/2020 | Yun et al. |
| 2020/0144352 A1 | 5/2020 | Lee et al. |
| 2020/0176542 A1 | 6/2020 | Park et al. |
| 2020/0194721 A1 | 6/2020 | Lee et al. |
| 2020/0227505 A1 | 7/2020 | Kim et al. |
| 2020/0236259 A1 | 7/2020 | Nakamura et al. |
| 2020/0310186 A1 | 10/2020 | Ina et al. |
| 2020/0310595 A1 | 10/2020 | Akhavan Fomani |
| 2020/0349886 A1 | 11/2020 | Lin et al. |
| 2020/0381486 A1 | 12/2020 | Jeong et al. |
| 2021/0026498 A1 | 1/2021 | Moy et al. |
| 2021/0193754 A1 | 6/2021 | Han et al. |
| 2021/0231615 A1* | 7/2021 | Munemoto .......... G01N 29/036 |
| 2021/0240303 A1 | 8/2021 | Blondin et al. |
| 2022/0350446 A1 | 11/2022 | Song et al. |
| 2023/0049317 A1 | 2/2023 | Wang et al. |
| 2023/0083578 A1 | 3/2023 | Choi et al. |
| 2023/0205384 A1 | 6/2023 | Song et al. |
| 2023/0205415 A1 | 6/2023 | Yeo et al. |
| 2023/0209970 A1 | 6/2023 | Zhang et al. |
| 2023/0229255 A1* | 7/2023 | Kim ...................... G06F 3/0412 |
| | | 345/173 |
| 2023/0280870 A1* | 9/2023 | Kim ...................... G06F 3/0416 |
| | | 345/174 |
| 2023/0297199 A1 | 9/2023 | Blondin et al. |
| 2023/0350512 A1* | 11/2023 | Jung .................. G06V 40/1306 |
| 2023/0376153 A1* | 11/2023 | Wu ....................... G06F 3/0445 |
| 2024/0077981 A1 | 3/2024 | Gogte et al. |

OTHER PUBLICATIONS

Non-Final Office Action received for U.S. Appl. No. 18/174,425, mailed on Dec. 7, 2023, 11 pages.

Advisory Action received for U.S. Appl. No. 18/174,425, mailed on Aug. 29, 2024, 3 pages.

Non-Final Office Action received for U.S. Appl. No. 18/459,026, mailed on Sep. 23, 2024, 20 pages.

Notice of Allowance received for U.S. Appl. No. 18/174,425, mailed on Oct. 1, 2024, 16 Pages.

* cited by examiner

SYSTEMS AND METHODS FOR TOUCH SENSING ON DEVICES INCLUDING REGIONS WITH AND WITHOUT TOUCH ELECTRODES

CROSS-REFERENCE TO RELATED APPLICATIONS

This application claims the benefit of U.S. Provisional Application No. 63/374,744, filed Sep. 6, 2022, the content of which is incorporated herein by reference in its entirety for all purposes.

FIELD OF THE DISCLOSURE

This relates generally to electronic devices such as touch sensor panels/screens, including a first region having a plurality of touch electrodes and a second region without touch electrodes, and more particularly to touch sensor panels/screens including applying different algorithms for touch detection.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are popular because of their ease and versatility of operation as well as their declining price. Touch screens can include a touch sensor panel, which can be a clear panel with a touch-sensitive surface, and a display device such as a liquid crystal display (LCD), light emitting diode (LED) display or organic light emitting diode (OLED) display that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without touching the surface. In some examples, a touch screen or touch sensor panel can detect touches by or proximity of multiple objects (e.g., one or more fingers or other touch objects), and such interactions can be used to perform various inputs using multiple objects. Such a touch screen or touch sensor panel may be referred to as a "multi-touch" touch screen or touch sensor panel and may accept "multi-touch gestures" as inputs.

Capacitive touch sensor panels can be formed by a matrix of transparent, semi-transparent or non-transparent conductive plates (e.g., touch electrodes) made of materials such as Indium Tin Oxide (ITO). In some examples, the conductive plates can be formed from other materials including conductive polymers, metal mesh, graphene, nanowires (e.g., silver nanowires) or nanotubes (e.g., carbon nanotubes). In some implementations, due in part to their substantial transparency, some capacitive touch sensor panels can be overlaid on a display to form a touch screen, as described above. Some touch screens can be formed by at least partially integrating touch sensing circuitry into a display pixel stack-up (i.e., the stacked material layers forming the display pixels).

SUMMARY OF THE DISCLOSURE

This relates generally to electronic devices such as touch sensor panels/screens, including a first region having a plurality of touch electrodes and a second region without touch electrodes, and more particularly to touch sensor panels/screens including the use of different algorithms for touch detection. In some examples, in response to determining that a touch patch (e.g., input patch) corresponds to a first region of a touch screen, a first algorithm is applied to determine whether an object corresponding to the touch patch is in contact with (or in proximity to) the touch screen. In some examples, in response to determining that a touch patch corresponds to a second region of a touch screen, a second algorithm (e.g., augmented algorithm) is applied to determine whether an object corresponding to the touch patch is in contact with (or in proximity to) the touch screen. In some examples, the augmented algorithm includes a model (e.g., a machine learning model) that is configured to apply a non-linear model or a linear model to a plurality of features computed from a touch image and/or from the touch patch. In some examples, the augmented algorithm can be used for input patches corresponding to the second region of the touch screen to determine whether an object (e.g., finger of a user) is in contact with the touch screen or whether the object is hovering over the touch screen. In this way, by applying the augmented algorithm for input patches corresponding to the second region of the touch screen where touch electrodes are not present, the electronic device can improve user experience in detecting touch input corresponding to the second region without touch electrodes. Additionally, the augmented algorithm allows for improved performance in distinguishing between various gesture conditions (e.g., light tap, hover, no-touch) for touch input corresponding to the second region (e.g., reducing rate of wrongly classifying hover inputs as a touch input and touch inputs as hover inputs).

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates generally to electronic devices such as touch sensor panels/screens, including a first region having a plurality of touch electrodes and a second region without touch electrodes, and more particularly to touch sensor panels/screens including the use of different algorithms for touch detection. In some examples, in response to determining that a touch patch (e.g., input patch) corresponds to a first region of a touch screen, a first algorithm is applied to determine whether an object corresponding to the touch patch is in contact with (or in proximity to) the touch screen. In some examples, in response to determining that a touch patch corresponds to a second region of a touch screen, a second algorithm (e.g., augmented algorithm) is applied to determine whether an object corresponding to the touch patch is in contact with (or in proximity to) the touch screen. In some examples, the augmented algorithm includes a mode (e.g., a machine learning model) that is configured to apply a non-linear model or a linear model to a plurality of features computed from a touch image and/or from the touch patch. In some examples, the augmented algorithm can be used for input patches corresponding to the second region of the touch screen to determine whether an object (e.g., finger of a user) is in contact with the touch screen or whether the object is hovering over the touch screen. In this way, by applying the augmented algorithm for input patches corresponding to the second region of the touch screen where touch electrodes are not present, the electronic device can improve user experience in detecting touch input corresponding to the second region without touch electrodes. Additionally, the augmented algorithm allows for improved performance in distinguishing between various gesture conditions (e.g., light tap, hover, no-touch) for touch input corresponding to the second region (e.g., reducing rate of wrongly classifying hover inputs as a touch input and touch inputs as hover inputs).

Figure 1A:
FIGS. 1A-1E illustrate touch sensing devices or systems that can include a touch screen or touch sensor panel according to examples of the disclosure.
Figure 1B:
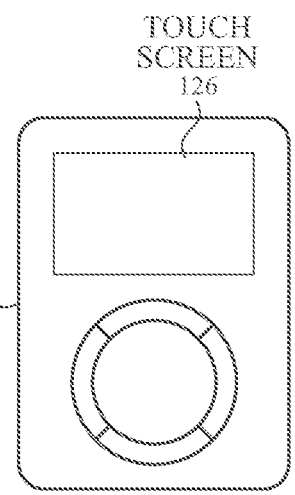
Figure 1C:
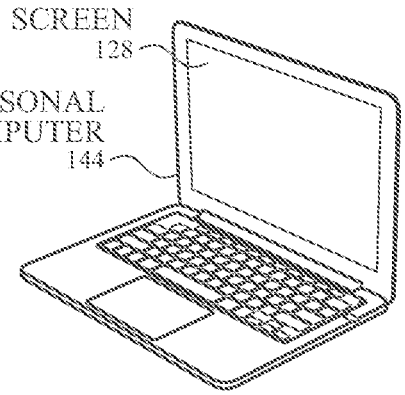
Figure 1D:
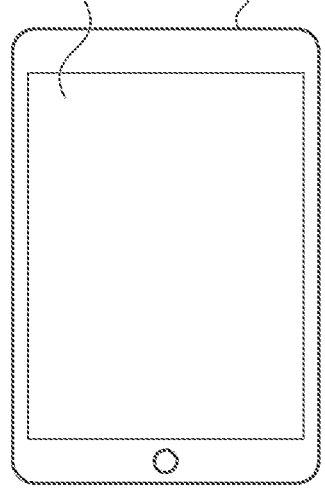
Figure 1E:
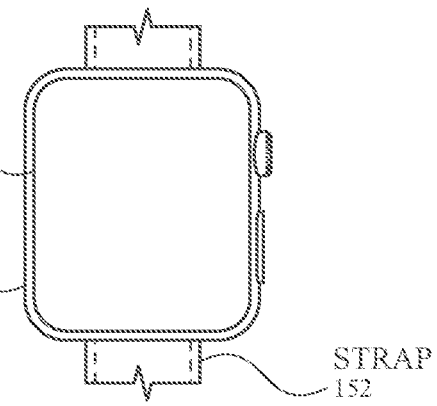

FIGS. 1A-1E illustrate touch sensing devices or systems that can include a touch screen or touch sensor panel according to examples of the disclosure. The touch screen or touch sensor panel can include a first region including touch electrodes and a second region without touch electrodes. The touch screen or touch sensor panel can include processing circuitry configured to apply multiple touch sensing algorithms including an augmented algorithm for input patches corresponding to a second region of the touch screen to enable the touch screen to distinguish between light touch and hover input corresponding to the second region of the touch screen. FIG. 1A illustrates an example mobile telephone 136 that can include a touch screen 124 according to examples of the disclosure. FIG. 1B illustrates an example digital media player 140 that can include a touch screen 126 and/or a touch sensor panel according to examples of the disclosure. FIG. 1C illustrates an example personal computer 144 that can include a touch screen 128 and a track pad with a touch sensor panel according to examples of the disclosure. FIG. 1D illustrates an example tablet computing device 148 that can include a touch screen 130 according to examples of the disclosure. FIG. 1E illustrates an example wearable device 150 that includes a touch screen 132 and can be attached to a user using a strap 152 according to examples of the disclosure. It is understood that a touch screen (which can include a touch sensor panel) or a touch sensor panel (without a touch screen, such as in a trackpad) can be implemented in other devices as well, and that the example systems of FIGS. 1A-1E can further include touch sensor panels on surfaces not shown in the figures. Touch screens 124, 126, 128, 130 and 132 can be multi-touch touch screens that can detect multiple objects.

In some examples, touch screens 124, 126, 128, 130 and 132 and touch sensor panels can be based on self-capacitance. A self-capacitance based touch system can include a matrix of small, individual plates of conductive material or groups of individual plates of conductive material forming larger conductive regions that can be referred to as touch electrodes or as touch node electrodes (as described below with reference to FIG. 4B). For example, a touch screen or touch sensor panel can include a plurality of individual touch electrodes, each touch electrode identifying or representing a unique location (e.g., a touch node) on the touch screen or touch sensor panel at which touch or proximity is to be sensed, and each touch node electrode being electrically isolated from the other touch node electrodes in the touch screen/panel. Such a touch screen/panel can be referred to as a pixelated self-capacitance touch screen/panel, though it is understood that in some examples, the touch node electrodes on the touch screen/panel can be used to perform scans other than self-capacitance scans on the touch screen/panel (e.g., mutual capacitance scans). During operation, a touch node electrode can be stimulated with an alternating current (AC) waveform, and the self-capacitance to ground of the touch node electrode can be measured. As an object approaches the touch node electrode, the self-capacitance to ground of the touch node electrode can change (e.g., increase). This change in the self-capacitance of the touch node electrode can be detected and measured by the touch sensing system to determine the positions of multiple objects when they touch, or come in proximity to, the touch screen/panel. In some examples, the touch node electrodes of a self-capacitance based touch system can be formed from rows and columns of conductive material, and changes in the self-capacitance to ground of the rows and columns can be detected, similar to above. In some examples, a touch screen/panel can be multi-touch, single touch, projection scan, full-imaging multi-touch, capacitive touch, etc.

In some examples, touch screens 124, 126, 128, 130 and 132 and touch sensor panels can be based on mutual capacitance. A mutual capacitance based touch system can include electrodes arranged as drive and sense lines that may cross over each other on different layers (in a double-sided configuration), or may be adjacent to each other on the same layer (e.g., as described below with reference to FIG. 4A). The crossing or adjacent locations can form touch nodes. During operation, the drive line can be stimulated with an AC waveform and the mutual capacitance of the touch node can be measured. As an object approaches the touch node, the mutual capacitance of the touch node can change (e.g., decrease). This change in the mutual capacitance of the touch node can be detected and measured by the touch sensing system to determine the positions of multiple objects when they touch, or come in proximity to, the touch screen/panel. As described herein, in some examples, a mutual capacitance based touch system can form touch nodes from a matrix of small, individual plates of conductive material.

In some examples, touch screens 124, 126, 128, 130 and 132 or touch sensor panels can be based on mutual capacitance and/or self-capacitance. The electrodes can be arranged as a matrix of small, individual plates of conductive material (e.g., as in touch node electrodes 408 in touch screen/panel 402 in FIG. 4B) or as drive lines and sense lines (e.g., as in row touch electrodes 404 and column touch electrodes 406 in touch screen/panel 400 in FIG. 4A), or in another pattern. The electrodes can be configurable for mutual capacitance or self-capacitance sensing or a combination of mutual and self-capacitance sensing. For example, in one mode of operation electrodes can be configured to sense mutual capacitance between electrodes and in a different mode of operation electrodes can be configured to sense self-capacitance of electrodes. In some examples, some of the electrodes can be configured to sense mutual capacitance therebetween and some of the electrodes can be configured to sense self-capacitance thereof.

Figure 2:
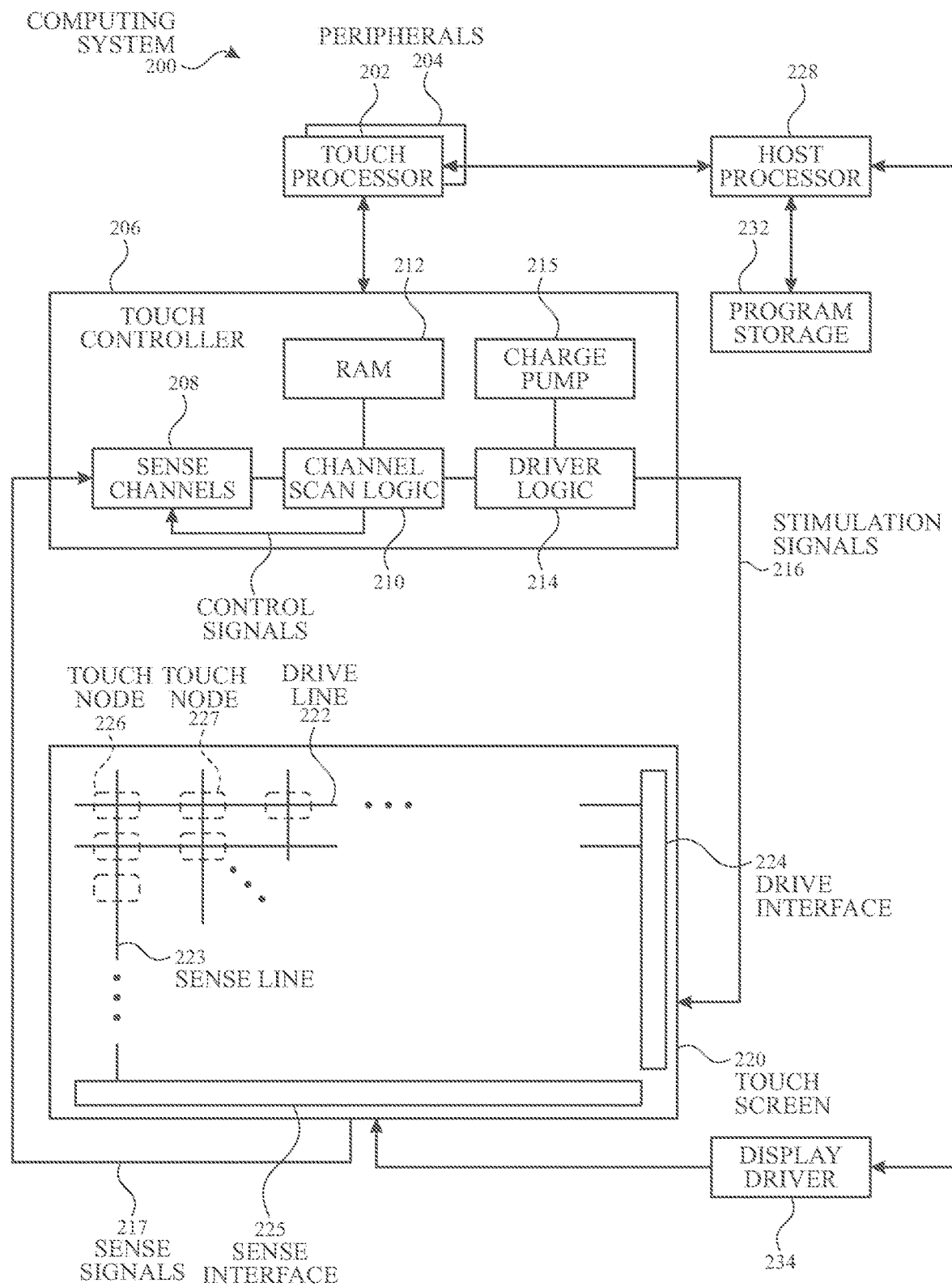
FIG. 2 illustrates a computing system including a touch screen according to examples of the disclosure.

FIG. 2 illustrates an example computing system including a touch screen according to examples of the disclosure, although it should be understood that the illustrated touch screen 220 (which includes a touch sensor panel) could instead be only a touch sensor panel. Computing system 200 can be included in, for example, a mobile phone, tablet, touchpad, portable or desktop computer, portable media player, wearable device or any mobile or non-mobile computing device that includes a touch screen or touch sensor panel. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208, channel scan logic 210 and driver logic 214. Channel scan logic 210 can access RAM 212, autonomously read data from the sense channels and provide control for the sense channels. In addition, channel scan logic 210 can control driver logic 214 to generate stimulation signals 216 at various frequencies and/or phases that can be selectively applied to drive regions of the touch sensing circuitry of touch screen 220, as described in more detail below. In some examples, touch controller 206, touch processor 202 and peripherals 204 can be integrated into a single application specific integrated circuit (ASIC), and in some examples can be integrated with touch screen 220 itself. The example computing system 200 of FIG. 2 can be configured to implement and perform any of the scans and comparisons described below.

It should be apparent that the architecture shown in FIG. 2 is only one example architecture of computing system 200, and that the system could have more or fewer components than shown, or a different configuration of components. In some examples, computing system 200 can include an energy storage device (e.g., a battery) to provide a power supply and/or communication circuitry to provide for wired or wireless communication (e.g., cellular, Bluetooth, Wi-Fi, etc.). The various components shown in FIG. 2 can be implemented in hardware, software, firmware or any combination thereof, including one or more signal processing and/or application specific integrated circuits.

Computing system 200 can include a host processor 228 for receiving outputs from touch processor 202 and performing actions based on the outputs. For example, host processor 228 can be connected to program storage 232 and a display controller/driver 234 (e.g., a Liquid-Crystal Display (LCD) driver). It is understood that although some examples of the disclosure may be described with reference to LCD displays, the scope of the disclosure is not so limited and can extend to other types of displays, such as Light-Emitting Diode (LED) displays, including Organic LED (OLED), Active-Matrix Organic LED (AMOLED) and Passive-Matrix Organic LED (PMOLED) displays. Display driver 234 can provide voltages on select (e.g., gate) lines to each pixel transistor and can provide data signals along data lines to these same transistors to control the pixel display image.

Host processor 228 can use display driver 234 to generate a display image on touch screen 220, such as a display image of a user interface (UI), and can use touch processor 202 and touch controller 206 to detect a touch on or near touch screen 220, such as a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Note that one or more of the functions described in this disclosure can be performed by firmware stored in memory (e.g., one of the peripherals 204 in FIG. 2) and executed by touch processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. In some examples, RAM 212 or program storage 232 (or both) can be a non-transitory computer readable storage medium. One or both of RAM 212 and program storage 232 can have stored therein instructions, which when executed by touch processor 202 or host processor 228 or both, can cause the device including computing system 200 to perform one or more functions and methods of one or more examples of this disclosure. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Touch screen 220 can be used to derive touch information at multiple discrete locations of the touch screen, referred to herein as touch nodes. Touch screen 220 can include touch sensing circuitry that can include a capacitive sensing medium having a plurality of drive lines 222 and a plurality of sense lines 223. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Drive lines 222 can be driven by stimulation signals 216 from driver logic 214 through a drive interface 224, and resulting sense signals 217 generated in sense lines 223 can be transmitted through a sense interface 225 to sense channels 208 in touch controller 206. In this way, drive lines and sense lines can be part of the touch sensing circuitry that can interact to form capacitive sensing nodes, which can be thought of as touch picture elements (touch pixels) and referred to herein as touch nodes, such as touch nodes 226 and 227. This way of understanding can be particularly useful when touch screen 220 is viewed as capturing an "image" of touch ("touch image"). In other words, after touch controller 206 has determined whether a touch has been detected at each touch nodes in the touch screen, the pattern of touch nodes in the touch screen at which a touch occurred can be thought of as an "image" of touch (e.g., a pattern of fingers touching the touch screen). As used herein, an electrical component "coupled to" or "connected to" another electrical component encompasses a direct or indirect connection providing electrical path for communication or operation between the coupled components. Thus, for example, drive lines 222 may be directly connected to driver logic 214 or indirectly connected to drive logic 214 via drive interface 224 and sense lines 223 may be directly connected to sense channels 208 or indirectly connected to sense channels 208 via sense interface 225. In either case an electrical path for driving and/or sensing the touch nodes can be provided.

Figure 3A:
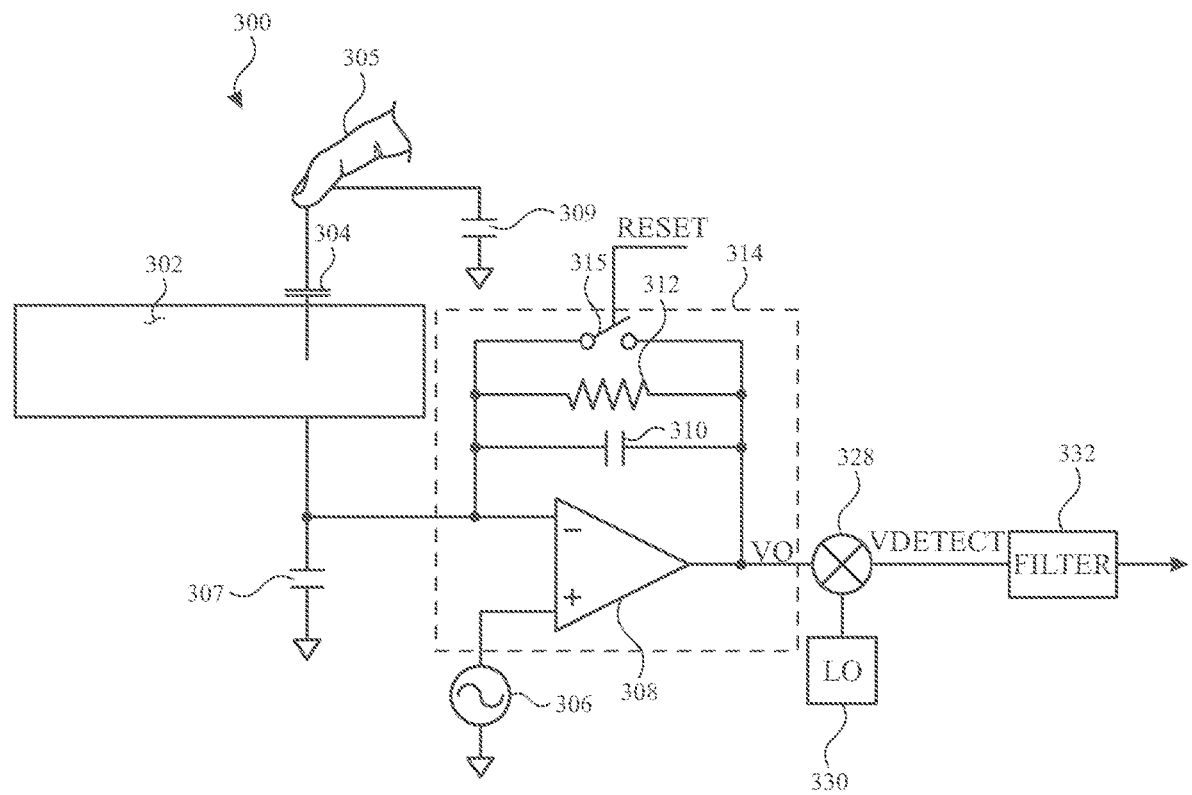
FIG. 3A illustrates a touch sensor circuit corresponding to a self-capacitance measurement of a touch node electrode and sensing circuit according to examples of the disclosure.

FIG. 3A illustrates an example touch sensor circuit 300 corresponding to a self-capacitance measurement of a touch node electrode 302 and sensing circuit 314 (e.g., corresponding to a sense channel 208) according to examples of the disclosure. Touch node electrode 302 can correspond to a touch electrode 404 or 406 of touch screen/panel 400 or a touch node electrode 408 of touch screen/panel 402. Touch node electrode 302 can have an inherent self-capacitance to ground associated with it, and also an additional self-capacitance to ground that is formed when an object, such as finger 305, is in proximity to or touching the electrode. The total self-capacitance to ground of touch node electrode 302 can be illustrated as capacitance 304. Touch node electrode 302 can be coupled to sensing circuit 314. Sensing circuit 314 can include an operational amplifier 308, feedback resistor 312 and feedback capacitor 310, although other configurations can be employed. For example, feedback resistor 312 can be replaced by a switched capacitor resistor in order to minimize a parasitic capacitance effect that can be caused by a variable feedback resistor. Touch node electrode 302 can be coupled to the inverting input (−) of operational amplifier 308. An AC voltage source 306 (Vac) can be coupled to the non-inverting input (+) of operational amplifier 308. Touch sensor circuit 300 can be configured to sense changes (e.g., increases) in the total self-capacitance 304 of the touch node electrode 302 induced by a finger or object either touching or in proximity to the touch screen/panel. Output 320 can be used by a processor to determine the presence of a proximity or touch event, or the output can be inputted into a discrete logic network to determine the presence of a proximity or touch event.

Figure 3B:
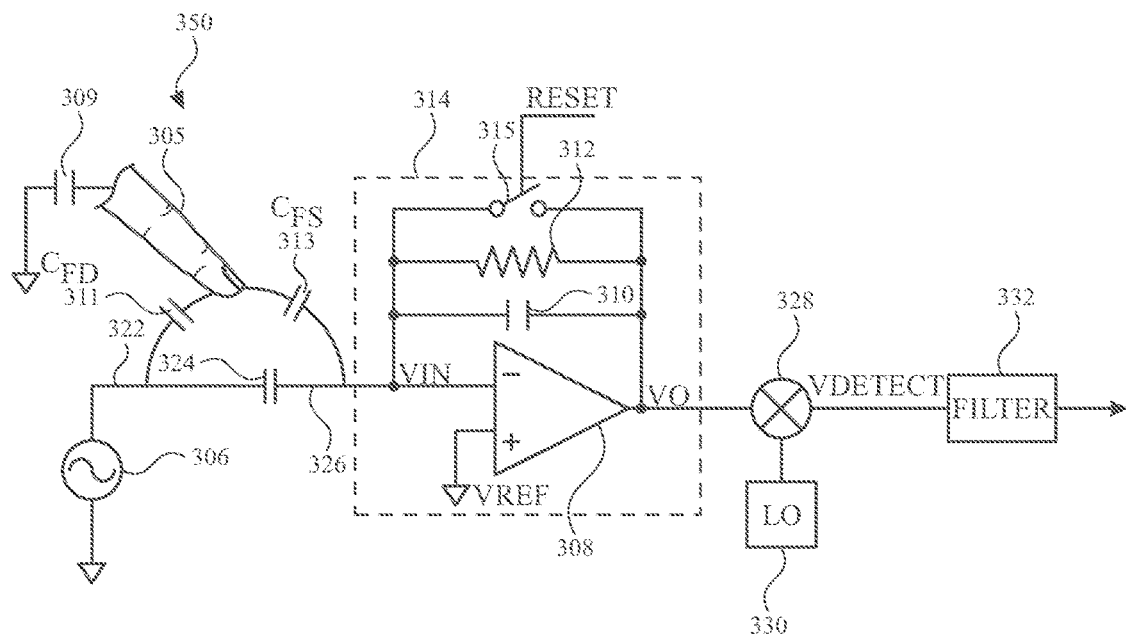
FIG. 3B illustrates a touch sensor circuit corresponding to a mutual-capacitance drive line and sense line and sensing circuit according to examples of the disclosure.

FIG. 3B illustrates an example touch sensor circuit 350 corresponding to a mutual-capacitance drive line 322 and sense line 326 and sensing circuit 314 (e.g., corresponding to a sense channel 208) according to examples of the disclosure. Drive line 322 can be stimulated by stimulation signal 306 (e.g., an AC voltage signal). Stimulation signal 306 can be capacitively coupled to sense line 326 through mutual capacitance 324 between drive line 322 and the sense line. When a finger or object 305 approaches the touch node created by the intersection of drive line 322 and sense line 326, mutual capacitance 324 can change (e.g., decrease). This change in mutual capacitance 324 can be detected to indicate a touch or proximity event at the touch node, as described herein. The sense signal coupled onto sense line 326 can be received by sensing circuit 314. Sensing circuit 314 can include operational amplifier 308 and at least one of a feedback resistor 312 and a feedback capacitor 310. FIG. 3B illustrates a general case in which both resistive and capacitive feedback elements are utilized. The sense signal (referred to as Vin) can be inputted into the inverting input of operational amplifier 308, and the non-inverting input of the operational amplifier can be coupled to a reference voltage Vref. Operational amplifier 308 can drive its output to voltage Vo to keep Vin substantially equal to Vref, and can therefore maintain Vin constant or virtually grounded. A person of skill in the art would understand that in this context, equal can include deviations of up to 15%. Therefore, the gain of sensing circuit 314 can be mostly a function of the ratio of mutual capacitance 324 and the feedback impedance, comprised of resistor 312 and/or capacitor 310. The output of sensing circuit 314 Vo can be filtered and heterodyned or homodyned by being fed into multiplier 328, where Vo can be multiplied with local oscillator 330 to produce Vdetect. Vdetect can be inputted into filter 332. One skilled in the art will recognize that the placement of filter 332 can be varied; thus, the filter can be placed after multiplier 328, as illustrated, or two filters can be employed: one before the multiplier and one after the multiplier. In some examples, there can be no filter at all. The direct current (DC) portion of Vdetect can be used to determine if a touch or proximity event has occurred. Note that while FIGS. 3A-3B indicate the demodulation at multiplier 328 occurs in the analog domain, output Vo may be digitized by an analog-to-digital converter (ADC), and blocks 328, 332 and 330 may be implemented in a digital fashion (e.g., 328 can be a digital demodulator, 332 can be a digital filter, and 330 can be a digital NCO (Numerical Controlled Oscillator).

Referring back to FIG. 2, in some examples, touch screen 220 can be an integrated touch screen in which touch sensing circuit elements of the touch sensing system can be integrated into the display pixel stack-ups of a display. The circuit elements in touch screen 220 can include, for example, elements that can exist in LCD or other displays (LED display, OLED display, etc.), such as one or more pixel transistors (e.g., thin film transistors (TFTs)), gate lines, data lines, pixel electrodes and common electrodes. In a given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor.

Figure 4B:
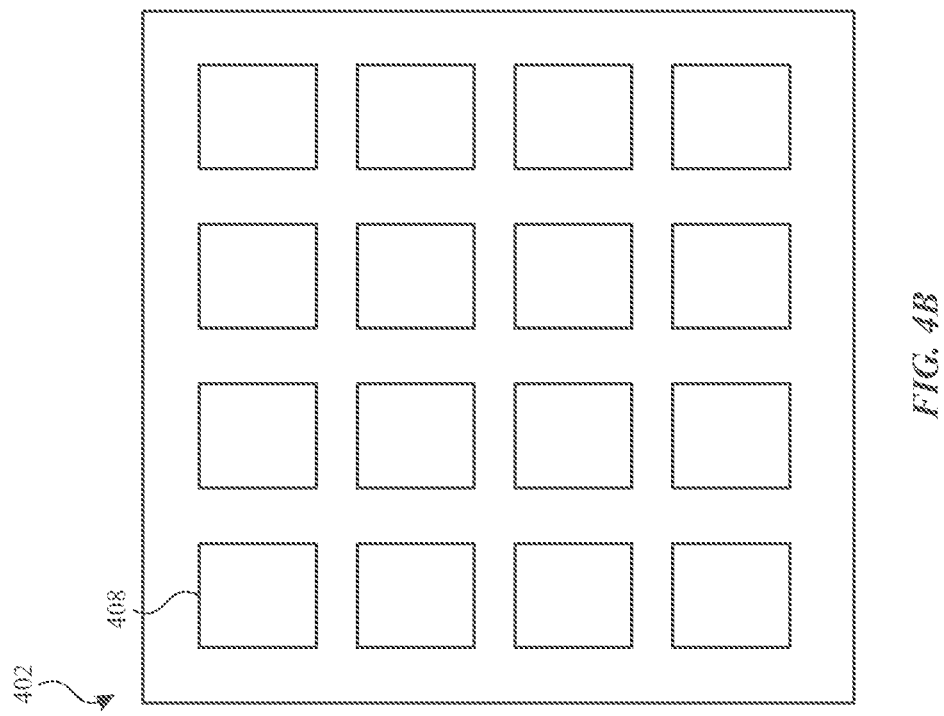
FIG. 4B illustrates a touch screen or touch sensor panel with touch node electrodes arranged in a pixelated touch node electrode configuration according to examples of the disclosure.
Figure 4A:
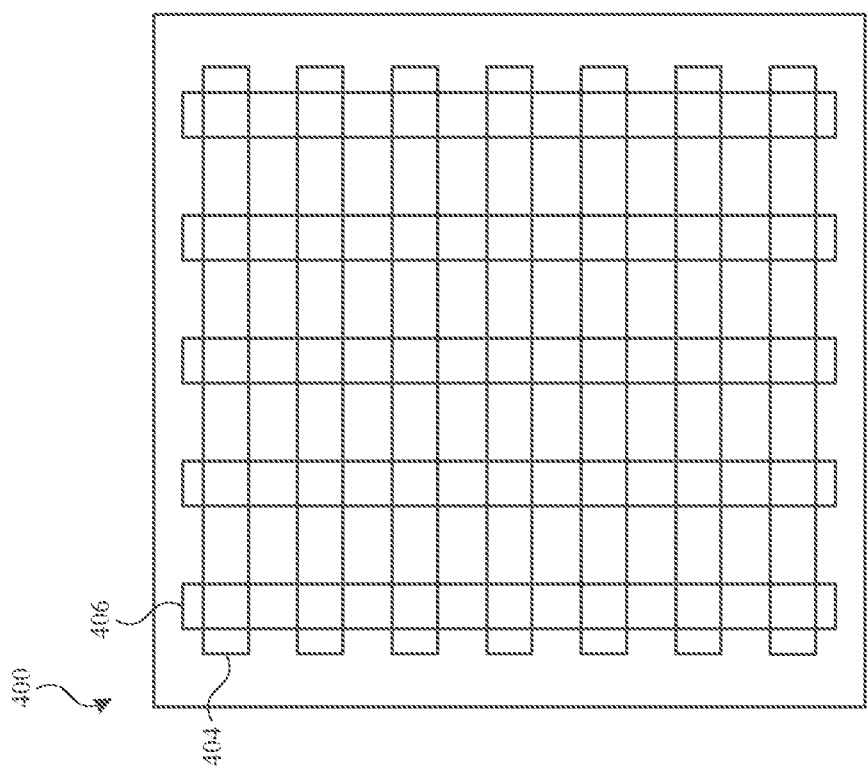
FIG. 4A illustrates a touch screen or touch sensor panel with touch electrodes arranged in rows and columns according to examples of the disclosure.

FIG. 4A illustrates a touch screen or touch sensor panel 400 with touch electrodes 404 and 406 arranged in rows and columns according to examples of the disclosure. Specifically, touch screen/panel 400 can include a plurality of touch electrodes 404 disposed as rows, and a plurality of touch electrodes 406 disposed as columns. Touch electrodes 404 and touch electrodes 406 can be on the same or different material layers on touch screen/panel 400, and can intersect with each other, as illustrated in FIG. 4A. In some examples, the electrodes can be formed on opposite sides of a transparent (partially or fully) substrate and from a transparent (partially or fully) semiconductor material, such as ITO, though other materials are possible. Electrodes displayed on layers on different sides of the substrate can be referred to herein as a double-sided sensor. In some examples, touch screen/panel 400 can sense the self-capacitance of touch electrodes 404 and 406 to detect touch and/or proximity activity on touch screen/panel 400, and in some examples, touch screen/panel 400 can sense the mutual capacitance between touch electrodes 404 and 406 to detect touch and/or proximity activity on touch screen 400.

FIG. 4B illustrates a touch screen or touch sensor panel 402 with touch node electrodes 408 arranged in a pixelated touch node electrode configuration according to examples of the disclosure. Specifically, touch screen/panel 402 can include a plurality of individual touch node electrodes 408, each touch node electrode identifying or representing a unique location on the touch screen/panel at which touch or proximity (i.e., a touch or proximity event) is to be sensed, and each touch node electrode being electrically isolated from the other touch node electrodes in the touch screen/panel, as previously described. Touch node electrodes 408 can be on the same or different material layers on touch screen/panel 402. In some examples, touch screen/panel 402 can sense the self-capacitance of touch node electrodes 408 to detect touch and/or proximity activity on touch screen/panel 402, and in some examples, touch screen/panel 402 can sense the mutual capacitance between touch node electrodes 408 to detect touch and/or proximity activity on touch screen/panel 402.

Figure 5:
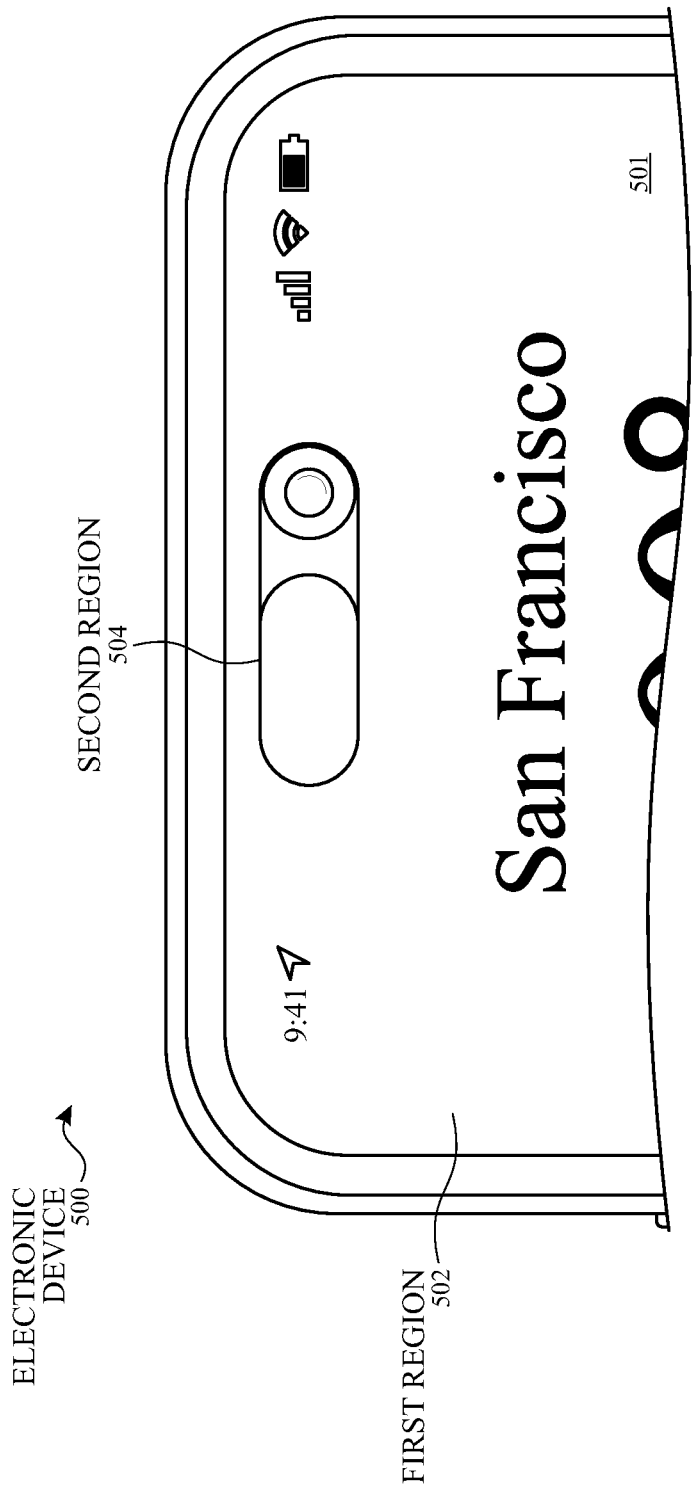
FIG. 5 illustrates an example of an electronic device comprising a first region and a second region of a touch screen according to examples of the disclosure.

FIG. 5 illustrates an example of an electronic device 500 comprising a first region 502 and a second region 504 of a touch screen according to examples of the disclosure. The first region 502 can correspond to portion of the touch screen including display and touch components (e.g., display pixels and touch electrodes). The touch electrodes are transparent (e.g., ITO) or formed from non-transparent materials (e.g., metal mesh, silver nanowire, etc.) that allow for sufficient optical transmission to allow for view of the display. The second region 504 can correspond to a portion of the touch that does not include display and touch components. The second region can correspond in-panel/in-screen one or more input/output devices such as a speaker and/or an image sensor, among other possibilities. As shown in FIG. 5, the second region 504 can viewed as being in the same plane as the first region 502, and the second region 504 is surrounded by the first region 502. In some examples, the first region 502 and the second region 504 can be any shape or size. As illustrated in FIG. 5, the second region 504 essentially rectangularly-shaped with rounded corners.

In some examples, the first region 502 includes a plurality of touch electrodes (e.g., corresponding to touch electrodes 404, 406 or of touch node electrodes 408). As noted above, a touch node represents a unique location corresponding to the intersection of drive and sense lines (e.g., electrode 404 and 406) or a unique location represented by a touch node electrode 408. During operation, as an object approaches the touch node, the change in capacitance can be detected and measured by the touch sensing system to determine the positions of multiple objects when they touch, or come in proximity to, the first region of the touch screen/panel including these touch nodes. Accordingly, within the first region 502 of the touch screen of electronic device 500, as an object approaches the touch screen 501 of the electronic device 500, the electronic device 500 can detect touch using a first algorithm that distinguishes between an object touching or hovering over the touch screen 501.

In some examples, the second region 504 of the touch screen of electronic device 500 does not include touch electrodes. In some examples, in areas of the touch screen where touch electrodes are not present (e.g., second region 504), when an object is touching or hovering over the touch screen 501 of the electronic device 500, the electronic device 500 may detect some signal, but due to the absence of touch electrodes in the second region, the electronic device 500 may not accurately differentiate between an object touching or hovering over the touch screen 501 using the first algorithm. Accordingly, performance metrics such as the rate of falsely detecting a hovering object as a touching object and the rate of falsely rejecting a touching object (e.g., detecting as a hovering object) may be higher for objects touching or in proximity to the second region 504 of the touch screen compared to objects touching or in proximity to the first region 502 of the touch screen.

Figure 6A:
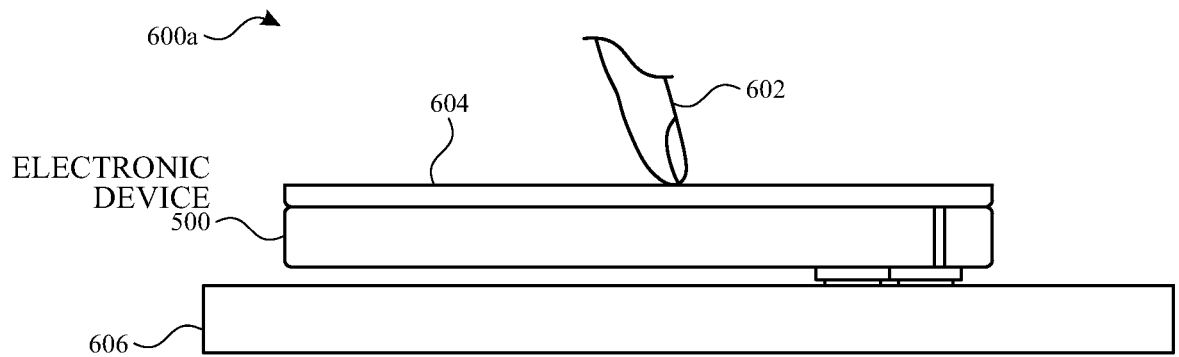
FIGS. 6A-6D illustrate various touch detection scenarios of an object relative to a touch screen and a corresponding signal and noise profile of the respective touch detection scenarios according to examples of the disclosure.

FIGS. 6A-6D illustrate various touch detection scenarios of an object relative to a touch screen and a corresponding signal and noise profile of the touch detection scenarios according to examples of the disclosure. As shown in FIG. 6A, the example illustrates a finger 602 (e.g., tip of index finger) of a user touching (e.g., tapping) on a touch screen 501. In particular, the electronic device 500 includes a screen protector 604 in a first layer positioned on top of the touch screen and the electronic device 500 laying a table 606 which provides an ungrounded system (e.g., the user ground is different than the ground of electronic device 500). The screen protector 604 creates a distance between the finger 602 and the touch screen 501, which causes a decrease in touch signal measured by the touch screen. As a result, the contact between finger 602 and the touch screen 501 may be considered a "light" touch or tap, because of the reduced signal level.

Figure 6B:
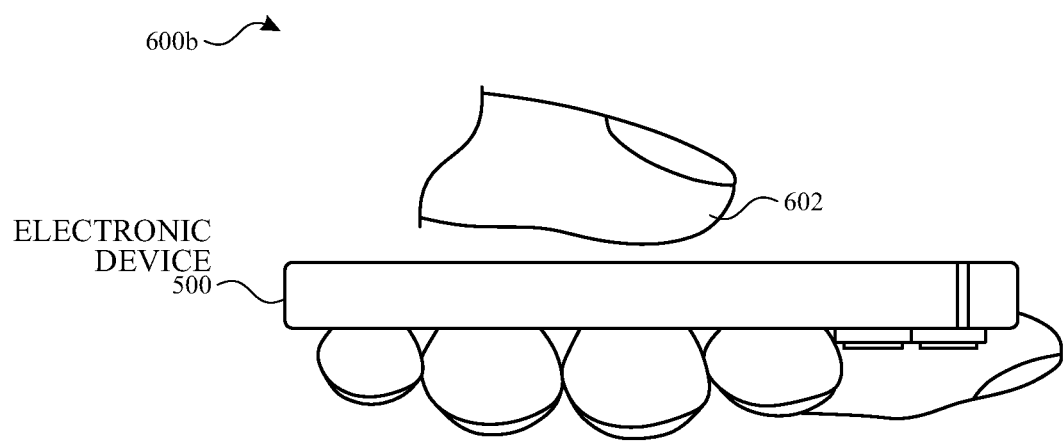
Figure 6C:
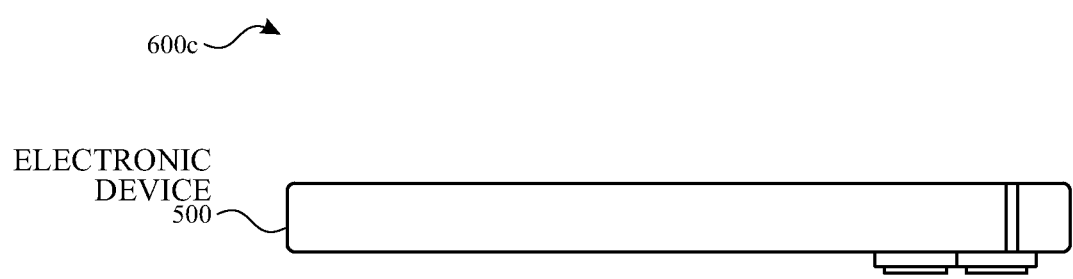

FIG. 6B illustrates a hand of a user supporting the electronic device 500 and a finger 602 (e.g., thumb) of a user hovering over the touch screen which provides a grounded system (e.g., the user ground and the ground of electronic device 500 are shared because the user's hand contacts the conductive housing of electronic device 500). As illustrated, the finger 602 (e.g., thumb) of the user is not in direct contact with the touch screen 501, but hovers within a threshold distance of the touch screen. FIG. 6C illustrates an electronic device 500 without an object (e.g., finger) touching or hovering over the touch screen.

Figure 6D:
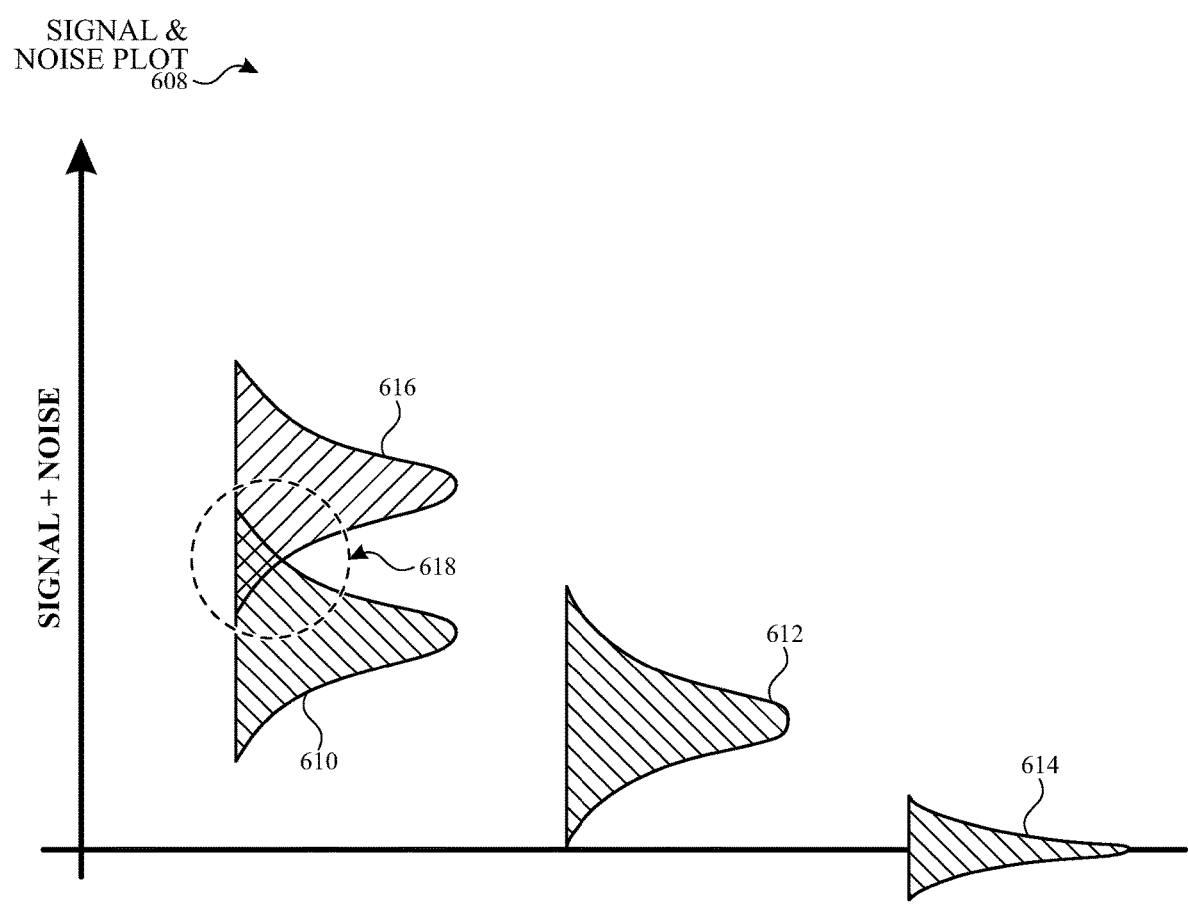

FIG. 6D illustrates signal and noise profile of the respective gesture conditions (e.g., light tap on touch screen using the tip of the index finger, thumb hovering over touch screen with thumb, no finger touching or hovering over touch screen) in FIGS. 6A-6C. In the illustrated example, the y-axis represents the signal and noise, and the x-axis spatially separates some of the different gesture conditions. Profile representation 614 represents the baseline profile (e.g., noise) when no object is detected (e.g., no-touch scenario). Profile representation 610 and 612 represent the signal and noise corresponding to the hover condition (e.g., in a grounded condition), where profile representations 610 and 612 corresponds to different sized fingers. For example, profile representation 610 corresponds to the scenario in FIG. 6B a relatively large finger 602 (e.g., thumb) is hovering over the touch screen. Profile representation 612 corresponds to the noise and signal produced by a relatively small finger 602 (e.g., tip of index finger, pinky finger, etc.) of a user hovering over the touch screen.

Profile representation 616 of the signal and noise corresponds to the touch scenario illustrated in FIG. 6A where a touch by a relatively small finger 602 (e.g., tip of index finger, pinky finger, etc.) is detected on the touch screen. As described above, the scenario optionally includes a screen protector 604 and/or an ungrounded touch system. Profile representation 616 and profile representation 610 are aligned to illustrate overlapping region 618. As shown in FIG. 6D, the profile representation 610 (e.g., hover condition by larger finger) and profile representation 616 (e.g., touch condition by small finger, optionally with screen protector and/or ungrounded system) overlap as represented by overlapping region 618. In some examples, due to the overlapping region 618, the electronic device 500 may have difficulty in accurately distinguishing between the two scenarios. In some examples, performance metrics such as the rate of falsely classifying a hover as a touch or falsely classifying a touch as a hover may be impacted by this overlap. The performance metrics may suffer (e.g., higher false classification rate) particularly for objects corresponding to the second region 504 of the touch screen as compared with than the first region 502. In some examples, to improve performance in accurately distinguish between the gesture conditions (e.g., hover and touch conditions) corresponding to the second region 504 (e.g., without touch electrodes), the electronic device is configured to apply a different algorithm for touches corresponding to the second region. In other words, the electronic device uses a first algorithm for input patches corresponding to the first region 502 to determine whether an object (e.g., finger) is in contact with the touch screen, hovering over the touch screen, or neither in the first region, and a second algorithm for input patches corresponding to the second region 504 to determine whether an object is in contact with the touch screen, hovering over the touch screen, or neither in the second region. In some examples, the second algorithm is an augmented algorithm which includes a model, such as a machine learning model (e.g., a non-linear model or a linear model) to classify the input patches corresponding to the second region.

Although not shown in FIG. 6D, additional profiles for other conditions exist. For example, larger and/or firm touches for an ungrounded system and/or for touch screens with a screen protector may have a profile representation that is higher on the y-axis than profile representation 616, and touches for a grounded system and/or for a touch screen without a screen protector may have a profile representation that is even higher on the y-axis. These profiles, however, can be sufficiently separated from profile representations corresponding to hovering objects.

Figure 7A:
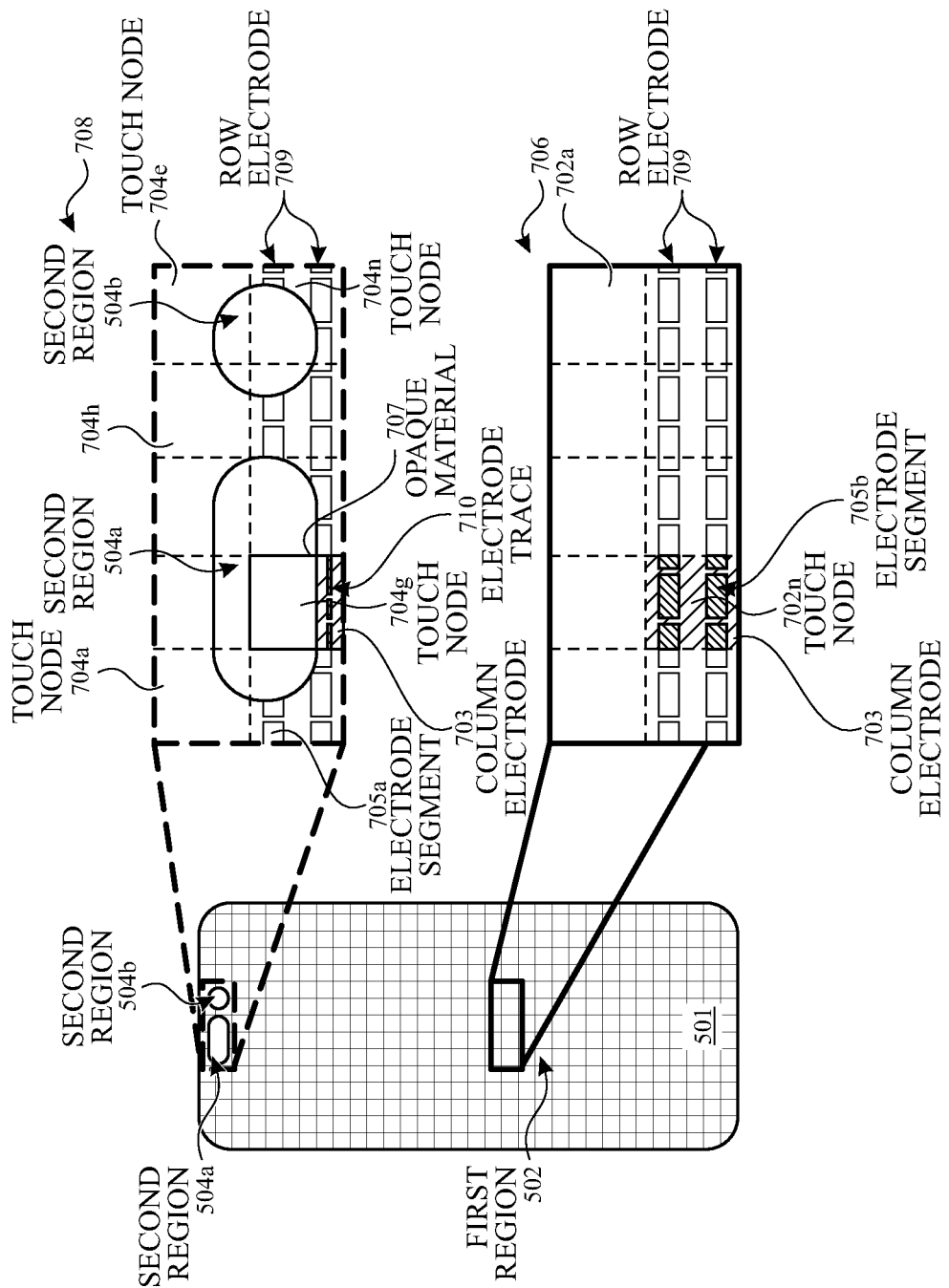
FIGS. 7A-7B illustrate a touch screen of an electronic device including a first region and a second region and touch signal plots corresponding to an object lightly contacting touch nodes corresponding to a first region and/or a second region of the electronic device according to examples of the disclosure.
Figure 7B:
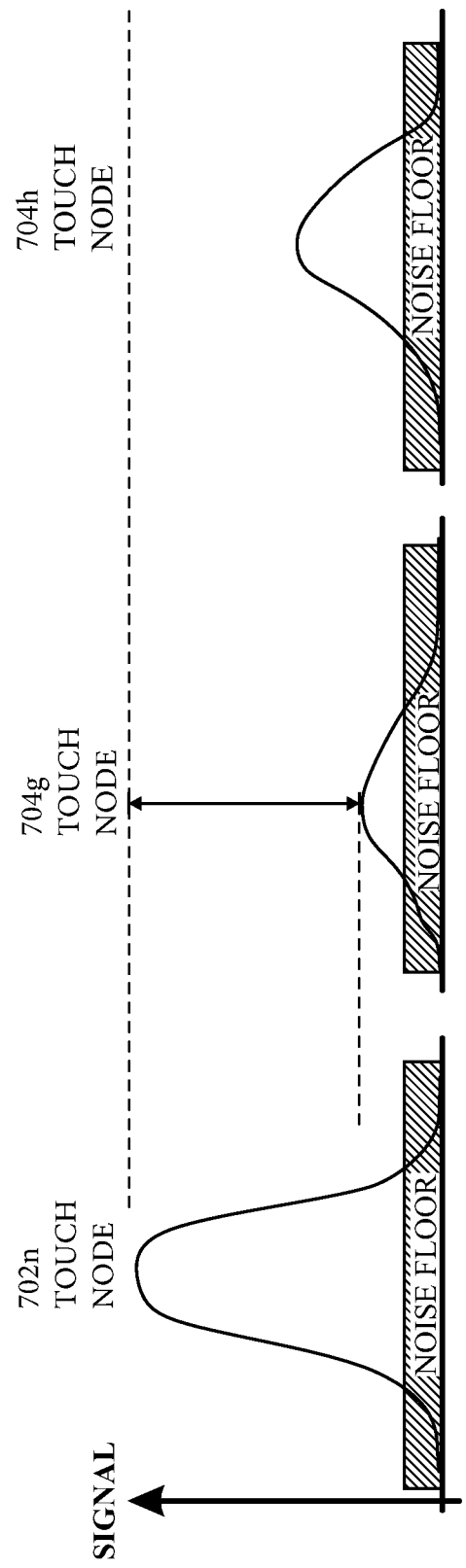

FIGS. 7A-7B illustrate a touch screen 501 of an electronic device 500 including a first region and a second region and touch signal plots corresponding to an object lightly contacting touch nodes corresponding to a first region 502 and/or a second region 504 of the electronic device 500 according to examples of the disclosure. In some examples, the touch screen 501 includes a first region 502 which includes a plurality of touch electrodes and one or more second regions 504a-504b without touch electrodes. In some examples, although there are no touch electrodes in the second regions 504a-504b, portions of touch electrodes referred to as electrode traces sensors (e.g., routing traces) because of their diminished area relative to other touch electrode segments are included around the periphery of the second regions in enable detection of some touch signal when an object contacts a touch node corresponding to the second region. In some examples, the touch screen 501 includes a first plurality of touch nodes 702a-702n in the first region 502 and a second plurality of touch nodes 704-704n that are at least partially (or fully) in the second region 504 (or second regions 504a-504b) of the electronic device. In some examples, each of the first plurality touch nodes 702a-702n and each of the second plurality of touch nodes 704-704n represents a unique location on the touch screen 501 at which touch, or proximity is to be sensed. In some examples, the touch screen 501 can be used to derive touch information at the touch nodes.

FIG. 7A illustrates view 706, which is an enlarged and somewhat more detailed view of a portion of the first region 502 of the touch screen. View 706 includes ten touch nodes (e.g., represented as rectangles). In some examples, each touch node corresponds to an adjacency of a respective row electrode 705 and a respective column electrode 703. For example, the row electrodes and column electrodes can be formed from conductive material in a first layer. In some examples, the rows electrodes can be formed from touch electrodes segments, such as touch electrode segments 705a and 705b. The touch electrode segments for a respective row electrode can be connected by bridges (not shown) in a second layer of the touch screen and/or in a border area. For example, row electrode 705 can include a two-dimensional array of touch electrode segments, which are horizontally interconnected by bridges in a second layer, and vertically interconnected in a border region. The column electrodes can be formed contiguously in first layer (with interconnectivity provided by gaps between row electrode segments.

For ease of illustration, a first row electrode 705 (including its corresponding touch electrode segments) is shown for a first row, and a portion of a first column electrode 703 is shown for touch node 702n. It is understood that a second row electrode (not shown) can be included for the touch nodes in the upper row of view 706 and that additional portions of column electrodes can be included for the touch nodes in view 706.

As shown in view 706, touch node 702n includes a plurality of row electrode segments (including row electrode segment 705b) of row electrode 705 and includes a portion of column electrode 703. In some examples, the presence of a finger near touch node 702n can decrease the capacitance between row electrode 705 and column electrode 703. This decrease in capacitance can be measured and is defined as the mutual capacitance touch signal for touch node 702n. Similar measurements can be performed for the other touch nodes. As illustrated in FIG. 7B, due to the area of the portion of the column electrode 703 and the row electrode segments of row electrode 705 in touch node 702n, an object (e.g., finger) contacting the touch screen at touch node 702n results in a touch signal well above the noise floor (e.g., on the order of about 50 Femtofarad (fF) for a light touch).

FIG. 7A also illustrates a view 708, which is an enlarged and somewhat more detailed view of a portion of the touch screen 501 including the second regions 504a-504b. View 708 includes a total of ten touch nodes (e.g., second plurality of touch nodes 704a-704g). In some examples, each of the second plurality of touch nodes 704a-704g at least partially include the second region 504 of the touch screen. For example, touch node 704g includes a portion of the second region 504a (e.g., bottom center portion) without touch electrodes, and a portion of the first region 502 including touch electrodes. For example, the portion of second region 504 can include an opaque material 707 and or other components. The touch electrodes of touch node 704g includes another portion of column electrode 703 and electrode trace 710 (e.g., routing trace in the first layer) corresponding to row electrode 709. The electrode trace 710 can also be viewed as a row touch electrode segment with a different dimensions). As additional examples, touch nodes 704a and 704e include a portion of the second regions 504a-504b (e.g., top left portion and top right portion, respectively) without touch electrodes, and a portion of the first region 502 including touch electrodes.

In some examples, electrode trace 710 (e.g., portions of touch electrodes) is routed around a portion of the periphery of the second region 504a. In some examples, electrode traces are necessary to route signal around the second regions 504a-504b, which interrupt the expected path in the absence of such regions. A mutual capacitance between the electrode trace 710 and the portion of column electrode 703 can be sensed to measure the touch signal for touch node 704g. Similar measurements can be performed for the other touch nodes. As illustrated in FIG. 7B, due to the diminished area of the portion of the column electrode 703 and the electrode trace of row electrode 709 in touch node 702g, an object (e.g., finger) contacts the touch screen at touch node 704g results in a touch signal at touch node 704g that is less than the detected touch signal at touch node 702n and much closer to the noise floor (e.g., on the order of about 10 Femtofarad (fF). Thus, due to the diminished signal for a touch node in the second region (e.g., touch node 704g) compared with the signal for a touch node in the first region (e.g., touch node 702n), detecting touch input and differentiating between different touch inputs can be more complicated for touches corresponding to the second region (e.g., in view 708) compared with touches corresponding to the first region (e.g., in view 706). FIG. 7B also illustrates a tough signal (e.g., on the order of about 20 Femtofarads) at touch node 704h. The touch signal measured at touch node 704h is greater than the touch signal measured at touch node 704g due to the increased area of the portion of the column electrode and the electrode trace/row electrode segments of row electrode 709 in touch node 704h relative to touch node 704g. The touch signal measured at touch node 704h is less than the touch signal measured at 702n, due to the diminished area of the portion of the column electrode and the electrode trace/row electrode segments of row electrode 709 in touch node 704h relative to the touch electrodes in touch node 702n.

As described herein, the signal-to-noise ratio (SNR) of touch signals varies between touch nodes corresponding to the first region and touch nodes corresponding to the second region. For example, the SNR is different at touch nodes 702n, 704g and 704h shown in FIG. 7B. As shown in FIG. 7B, in one example, the maximum signal corresponding to contact at touch node 704g can be approximately four times lower than the maximum signal corresponding to contact at touch node 702n (e.g., due to the reduced touch electrode area). In some examples, the maximum signal is 2-10 times lower at touch node 704g compared with touch node 702n. In some examples, errors may occur in classification as a touch patch as a hover input, as a touch input, or neither due to the reduced SNR at touch nodes corresponding to the second region. Accordingly, an augmented algorithm that includes a machine learning model can be used.

Figure 8:
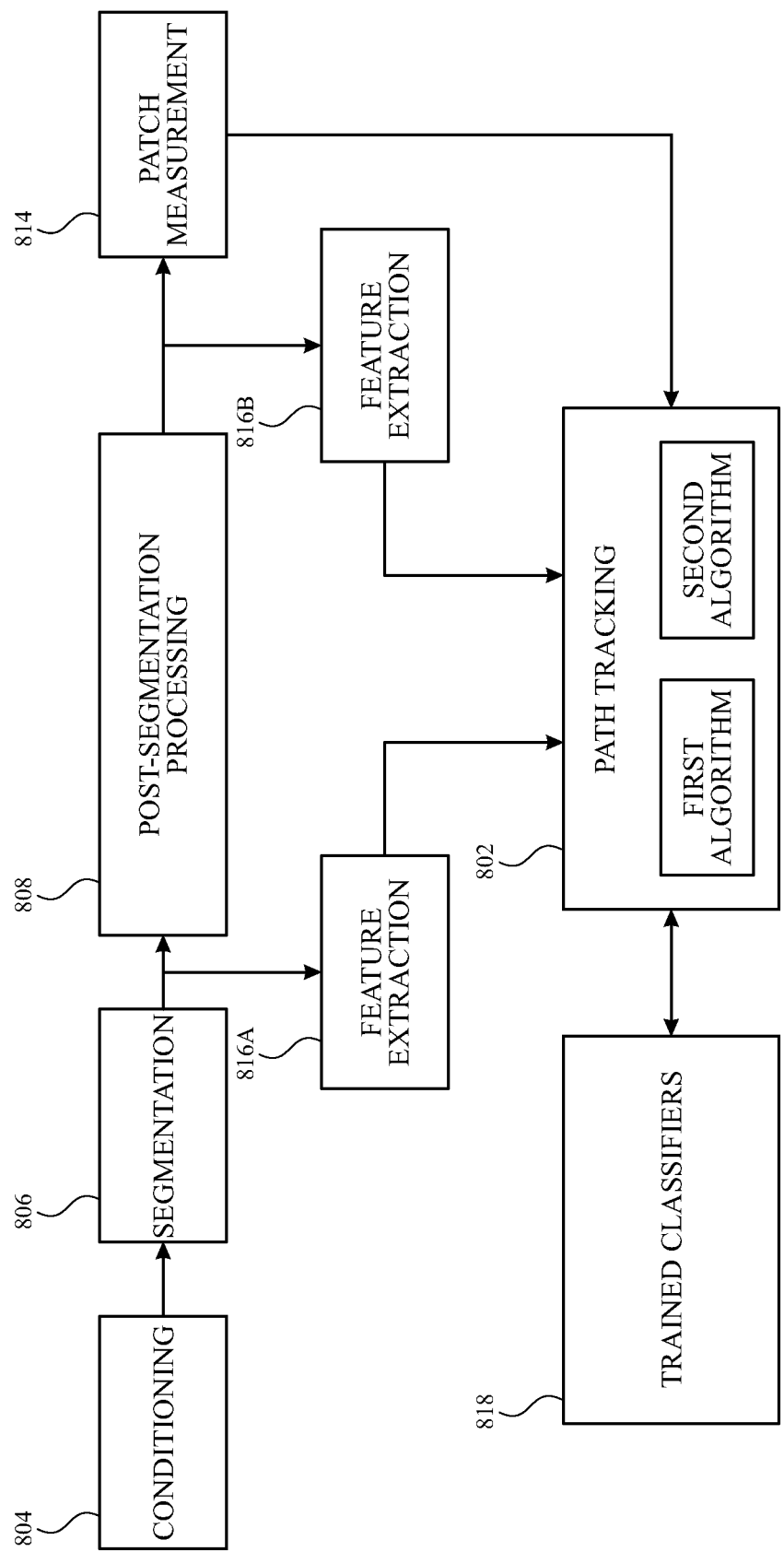
FIG. 8 illustrates a block diagram of touch processing including an augmented algorithm according to examples of the disclosure.

FIG. 8 illustrates a block diagram touch processing including an augmented algorithm according to examples of the disclosure. The input of the touch processing is a touch image representing the signal measured at the touch nodes of the touch sensor panel. As described herein, a touch image is generated by touch sensing operations. In some examples, when an object (e.g., finger) touches or hovers over the touch screen (e.g., proximate to the touch screen), touch signals at proximate touch nodes are detected and the signals from proximate touch nodes can be grouped together to form a touch patch for processing. In some examples, touch patches can be regions within the image of touch corresponding to touch nodes having signal values produced by an object (e.g., finger) touching or hovering over the touch screen.

In some examples, at conditioning block 804, a pre-segmentation image conditioning algorithm is applied to the touch image. In some examples, the conditioning includes baselining the touch image (e.g., subtracting a baseline touch image from the sensed touch image). In some examples, conditioning includes image filtering (e.g., temporal-smoothing over a period of time or spatial-smoothing using a two-dimensional diffusion operator or Gaussian kernel). In some examples, at segmentation block 806, the conditioned touch image is segmented into input patches (e.g., groups touch nodes) corresponding to the distinguishable objects (e.g., fingers or other hand parts, styli, etc.). In some examples, segmentation of the touch image includes identifying input patches with touch signal values exceeding a signal threshold.

In some examples, at post-segmentation processing block 808, the segmented image can be modified using transformation techniques. Although shown in post-segmentation processing block 808, in some examples, the transformation techniques can be applied before and/or after segmentation 806. In some examples, some transformation techniques are applied before (or as part of) segmentation 806 and some transformation techniques are applied after segmentation 806. In some examples, the transformation techniques can adjust touch signal values for touch nodes based on expected touch signal profiles for the touch sensor panel and/or boost the touch signal for touch nodes corresponding to the second region (e.g., to account for the decreased expected signal described above with respect to FIGS. 7A-7B. Additionally or alternatively, the transformation techniques can include expanding the size of the touch image by adding touch signals representing areas without touch nodes. For example, additional data points can be added to edges of the touch sensor panel (around which there are no touch node electrodes) or to touch nodes corresponding to the second region without any touch electrodes (or traces) to model the expected signal values if touch sensors would have been present at those locations. At patch measurement block 814, the parameters of the input patches can be determined. In some examples, the parameters can include signal measurements for the touch nodes of the input patches (e.g., maximum signal, minimum signal, signal statistics, total signal, etc.), the number of touch nodes of the input patches, and/or signal density of the input patches. In some embodiments, the parameters include the major and/or minor radius of the input patches. In some examples, at patch measurement block 814, a centroid of an input patch is computed and/or location information is extracted to determine the location of the input patch on the touch screen.

The input patches identified in a touch image can classified (e.g., as a hover or touch input) and can be tracked through multiple successive touch images. Input patches from a corresponding object captured across multiple touch images can be assigned to a corresponding path. Assigning input patches to paths can allow for tracking gesture inputs (e.g., swipe, pinch, etc.). In some examples, the path can track the input contact from an initial touchdown on the touch-sensitive surface through a liftoff from the touch-sensitive surface (optionally including hover states before or after touchdown and liftoff. In some examples, the input patches of a path can be analyzed to identify movement of the input patch across one or more touch images and thereby track movement of an object corresponding to the input patches. Although a path can be used to identify movement, some paths may not include movement (e.g., when the input patch remains in the same position from touchdown to liftoff, such as in a tap). The tracking can include tracking position, velocities, and/or geometries (e.g., shape, number of touch nodes) of the input patches from various touch images corresponding to a path. The classification and path tracking can be performed using path tracking block 802.

As described herein, two different algorithms can be used to classify patches for path tracking. As further illustrated in FIG. 8, path tracking block 802 includes a first algorithm and a second algorithm (augmented algorithm). In some examples, the above-described signal processing flow of blocks 804, 806, 808, and 814 are performed and the parameters (also referred to as features herein) of the patches are used as input to the first algorithm to classify the input patches and to use the classification for updating paths corresponding to the input patches. In some examples, the first algorithm uses different thresholds to differentiate between a touch, a hover, and neither. In some examples, a first threshold is used to differentiate between no touch/hover and hover, and a second threshold is used to differentiate between a hover and a touch. The same thresholds or slightly different thresholds can be used to detect the reverse conditions (e.g., termination of touch, termination of hover).

In some examples, the above-described signal processing flow of blocks 804, 806, 808, and 814 are augmented for touch processing for input patches corresponding to the second region. For example, as shown in FIG. 8, an output of segmentation block 806 and an output of post-segmentation processing block 808 can provide additional inputs to path tracking block 802 for use by the second algorithm. In some examples, the output of segmentation block 806 can have one or more features extracted from the segmented image at feature extraction block 816a. In some examples, the output of post-segmentation processing feature extraction block 808 can have one or more features extracted from the post-processed segmented image at block 816b. In some examples, the additional output from the segmentation block 806 for use by the second algorithm includes a segmented touch image of the entire touch sensor panel including the first and second region (e.g., without post-segmentation processing applied). In some examples, the additional output from the segmentation block 806 for use by the second algorithm includes a segmented touch image of the second region of the touch sensor panel (e.g., without post-segmentation processing applied). In some examples, the additional output from the post-segmentation processing block 806 for use by the second algorithm includes a segmented touch image of the second region of the touch sensor panel with post-segmentation processing applied). In some examples, the additional output from the post-segmentation processing block 806 for use by the second algorithm includes a patch map.

In some examples, the one or more features (e.g., before post-segmentation processing) extracted at feature extraction block 816a include a total signal of each post-segmentation input patch features, a peak signal of each post-segmentation input patch, a number of touch nodes in each of the patches, and a dot product of each input patch with gaussian kernel, among other possibilities. In some examples, the one or more features (e.g., after post-segmentation processing) extracted at feature extraction block 816b include some of the features described with reference to patch measurement block 814. In some examples, feature extraction block 816b can extract patch level parameters/features are extracted and received by augmented algorithm. For example, the extracted features optionally include a patch density (e.g., ratio of total patch signal and radius), a total signal of the patch, a peak signal of the patch, major/minor radius of the patch, etc.

At path tracking block 802, the second, augmented algorithm is configured to receive as inputs the output of segmentation block 806 (and/or features extracted therefrom using feature extraction block 816a), output of post-segmentation processing block 808 (and/or features extracted therefrom using feature extraction block 816b), and outputs of patch measurement block 814. The second algorithm can classify the input patch as hovering, touching, or neither. In some examples, the second algorithm uses a trained classifier 818 to classify the input patch based on some or all of the above-mentioned inputs. The classifier training can be used to identify patterns, similarities, and relationships between the inputs and outputs, and use the patterns, similarities, and relationships to distinguish between different touch/hover conditions (e.g., light tap, hover, no-touch). In some examples, the augmented algorithm includes a machine learning model or neural network (e.g., deep learning model, logistic regression, linear or non-linear support vector machine, boosted decision tree, convolutional neural network, gated recurrent network, long short-term memory network, etc.). The augmented algorithm which includes a machine learning model or neural network is trained using training data with an output labeled with the various output conditions (e.g., hover, touch, light touch, no-touch, etc.).

In some examples, the touch sensing system optionally uses the first algorithm for the first region and the second algorithm for the second region. In some examples, when an input patch is detected in the first region and not detected in the second region, the first algorithm is used for classification (and the additional inputs and feature extraction for the second, augmented algorithm are not used or performed). In some examples, when an input patch is detected in the second region, the second algorithm is used for classification of all input patches. In some examples, when an input patch is detected in the second region, the second algorithm is used for classification of input patches corresponding to the second region, and the first algorithm is used for classification of input patches corresponding to the first region.

Figure 9:
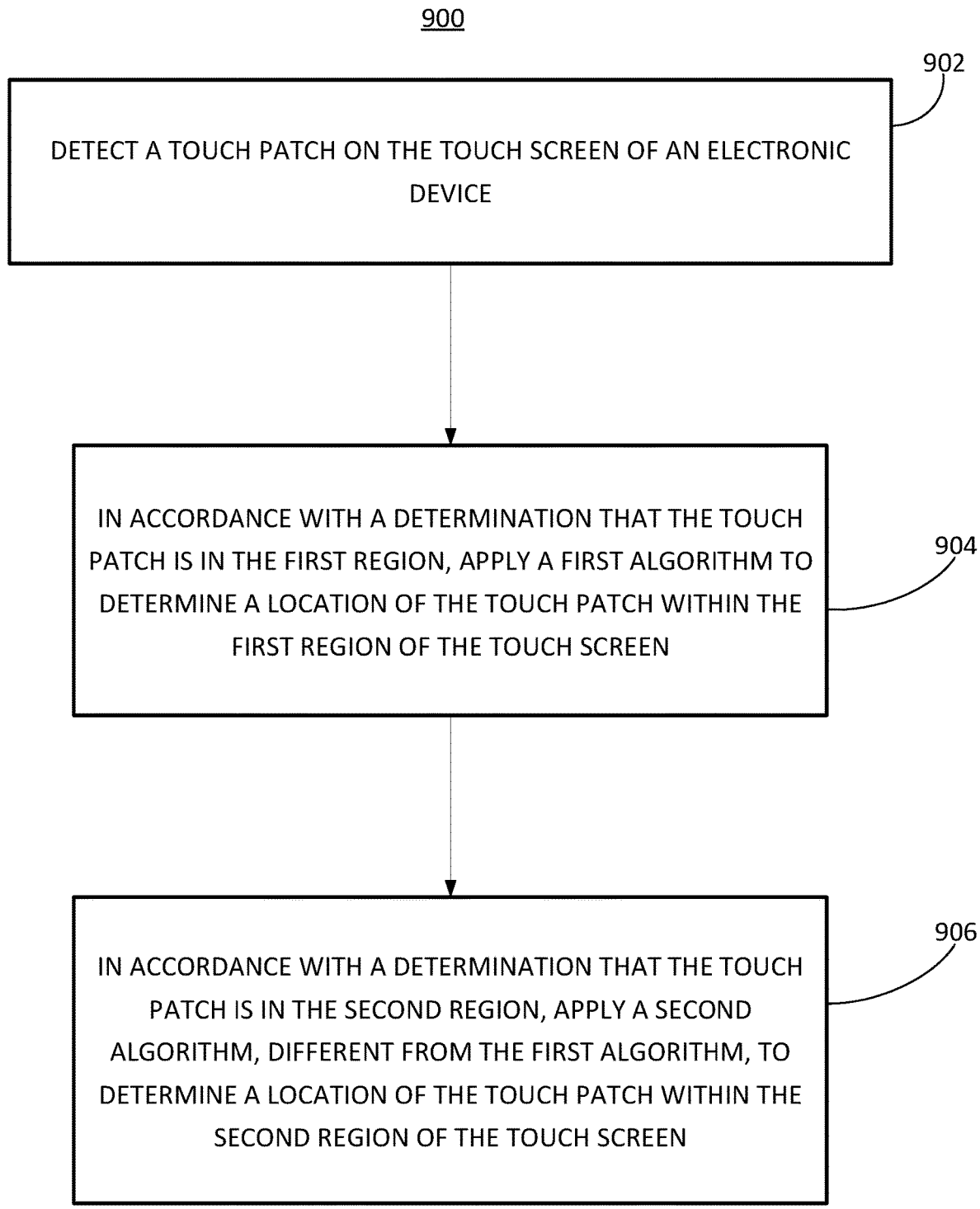
FIG. 9 is a flow diagram illustrating a method in which an electronic device applies a first algorithm or a second algorithm (e.g., augmented algorithm) for touch detection according to examples of the disclosure.

FIG. 9 is a flow diagram illustrating a method in which an electronic device applies a first algorithm or a second algorithm (e.g., augmented algorithm) for touch detection according to examples of the disclosure. The method 900 can be performed at an electronic device including computing system 200 and a touch screen (e.g., electronic device 500) as described above with reference to FIGS. 1-8 or by any other suitable device.

As describe below, the method 900 provides ways in which electronic devices can perform touch detection to distinguish between various gesture conditions (e.g., light tap on touch screen using index finger, thumb hovering over touch screen with thumb, no finger touching or hovering over touch screen, etc.). By using a first algorithm for input patches corresponding to a first region 502 of the touch screen where touch electrodes are included and an augmented algorithm for input patches corresponding to a second region where touch electrodes are not included, performance metrics can be improved.

The electronic device can be a mobile phone, personal computer, a media player, a tablet computer, a wearable device, etc. or any other device that includes a touch screen. In some examples, the touch screen of the electronic device comprises a first region which includes a plurality of touch electrodes and a second region without touch electrodes. In some examples, a first plurality of touch nodes of the touch screen is in the first region and a second plurality of touch nodes is at least partially or completely in the second region.

In some examples, the electronic device is configured to detect (902) a touch patch on the touch screen. In some examples, the touch patch can be regions within the image of touch corresponding to touch nodes having signal values above a threshold corresponding to an object (e.g., finger) touching or hovering over the touch screen. In some examples, in accordance with a determination that the touch patch corresponds to the first region 502 of the touch screen, a first algorithm is applied by the electronic device to determine (904) whether an object (e.g., finger) corresponding to the touch patch is in contact with the touch screen or hovering or neither (e.g., classifying the input patch for path tracking). For example, the first region 502 can be a region within the touch screen that includes a plurality of touch electrodes such as at touch node 702$n$ in FIG. 7A. When a finger of a user touches or hovers over touch node 702$n$ in FIG. 7A, a first algorithm is applied to determine whether the finger is touching the touch node or hovering over the touch node.

In some examples, in accordance with a determination that the touch patch corresponds to the second region 504 of the touch screen, a second algorithm (e.g., augmented algorithm), different algorithm than the first algorithm, is applied by the electronic device to determine (906) whether the object corresponding to the touch patch is in contact with the touch screen or hovering or neither (e.g., classifying the input patch for path tracking). For example, the second region 504 can be a region within the touch screen that does not include touch electrodes. When a finger of a user touches or hovers over touch node 704$g$ in FIG. 7A corresponding to second region 504$a$, a second algorithm is applied to determine whether the finger is touching the touch node or hovering over the touch node.

In some examples, the first algorithm is applied at the first region 502 where touch electrodes are present and the second algorithm (e.g., augmented algorithm) is applied at the second region 504 where touch electrodes are not present. In some examples, first algorithm applies a threshold to a first feature computed from a touch image. In some examples, the augmented algorithm includes a model (e.g., a machine learning model), the machine learning model configured to apply a non-linear model or a linear model to a plurality of inputs including a plurality of features computed from the touch image and from the touch patch. The plurality of features can include more than the first feature computed from the touch image that is used for the first algorithm. As noted above, using a machine learning model, the augmented algorithm can better distinguish between various gesture conditions (e.g., light tap, however, no-touch) at the second region of the touch screen where touch electrodes are not present, and SNR is greatly reduced relative to the first region.

The algorithms described herein can be implemented in hardware, software, firmware or any combination thereof, including one or more signal processing and/or application specific integrated circuits (ASICs). For example, one or more of the algorithms described herein can be implemented using software executed by one or more processors (e.g., microprocessors, ASICs, field programmable gate arrays (FPGAs), graphics processing units (GPUs), central processing units (CPUs), processing cores, etc.).

Therefore, according to the above, some examples of the disclosure are directed to an electronic device. The electronic device can comprise: a first region including a plurality of touch electrodes and a second region including an area without touch electrodes, wherein a first plurality of touch nodes of the touch screen is in the first region and a second plurality of touch nodes is at least partially in the second region; a processing circuitry configured to: detect a touch patch on the touch screen; in accordance with a determination that the touch patch is in the first region, apply a first algorithm to determine a location of the touch patch within the first region of the touch screen; and in accordance with a determination that the touch patch is in the second region, apply a second algorithm, different from the first algorithm, to determine a location of the touch patch within the second region of the touch screen. Additionally or alternatively to one or more of the examples disclosed above, in some examples, the first algorithm applies a threshold to a first feature computed from a touch image and wherein the second algorithm includes a model. Additionally or alternatively to one or more of the examples disclosed above, in some examples, the model is a machine learning model. Additionally or alternatively to one or more of the examples disclosed above, in some examples, the machine learning model is configured to apply a non-linear model (or a linear model) to a plurality of features computed from the touch image and from the touch patch. Additionally or alternatively to one or more of the examples disclosed above, in some examples, the second region is in a same plane as the first region. Additionally or alternatively to one or more of the examples disclosed above, in some examples, the second region is surrounded by the first region. Additionally or alternatively to one or more of the examples disclosed above, in some examples, the electronic device further comprises routing traces along a periphery of the second region. Additionally or alternatively to one or more of the examples disclosed above, in some examples, the first plurality of touch nodes of the touch screen includes a first plurality of touch electrodes segments that are configured to sense a touch signal. Additionally or alternatively to one or more of the examples disclosed above, in some examples, the second plurality of touch nodes of the touch screen includes a second plurality of touch electrode segments, and the second plurality of touch electrode segments have an area smaller than an area of the first plurality of touch electrode segments. Additionally or alternatively to one or more of the examples disclosed above, in some examples, the second algorithm includes as input an output of a segmentation process or one or more features extracted from the output of the segmentation process. Additionally or alternatively to one or more of the examples disclosed above, in some examples, the one or more extracted features includes patch level features. Additionally or alternatively to one or more of the examples disclosed above, in some examples, the second algorithm includes as input an output of a post-segmentation process or one or more features extracted from the output of the post-segmentation process. Additionally or alternatively to one or more of the examples disclosed above, in some examples, the second algorithm includes a second feature computed from the output of a post-segmentation process that is not used input for the first algorithm. Additionally or alternatively to one or more of the examples disclosed above, in some examples, the second algorithm includes a boosted decision tree classifier. Additionally or alternatively to one or more of the examples disclosed above, in some examples, the second algorithm includes a logistic regression classifier. Additionally or alternatively to one or more of the examples disclosed above, in some examples, the second algorithm includes a support vector machine. Additionally or alternatively to one or more of the examples disclosed above, in some examples, applying the second algorithm in the second region reduces a rate misclassifying a patch corresponding to a hovering object as a touch compared with the first algorithm. Additionally or alternatively to one or more of the examples disclosed above, in some examples, applying the second algorithm in the second region reduces a rate of misclassifying a patch corresponding to a touching object as a hover compared with the first algorithm.

Some examples of the disclosure are directed to an electronic device. The electronic device can comprise: a first region including a plurality of touch electrodes and a second region without touch electrodes, wherein a first plurality of touch nodes of the touch screen is in the first region and a second plurality of touch nodes is at least partially in the second region; processing circuitry configured to: detect a touch patch on the touch screen; in accordance with a determination that the touch patch is in the first region, apply a first algorithm to determine whether an object corresponding to the touch patch is in contact with the touch screen; and in accordance with a determination that the touch patch is in the second region, apply a second algorithm, different algorithm than the first algorithm, to determine whether the object corresponding to the touch patch is in contact with the touch screen. Additionally or alternatively to one or more of the examples disclosed above, in some examples, the first algorithm applies a threshold to a first feature computed from a touch image and wherein the second algorithm includes a machine learning model, the machine learning model configured to apply a non-linear model to a plurality of features computed from the touch image and from the touch patch. Additionally or alternatively to one or more of the examples disclosed above, in some examples, the second region is in a same plane as the first region. Additionally or alternatively to one or more of the examples disclosed above, in some examples, the electronic device further comprises routing traces along a periphery of the second region. Additionally or alternatively to one or more of the examples disclosed above, in some examples, the first algorithm applies a threshold to a first feature computed from a touch image and wherein the second algorithm includes a machine learning model, the machine learning model configured to apply a linear model to a plurality of features computed from the touch image and from the touch patch.

Some examples of the disclosure are directed to a non-transitory computer readable storage medium. The non-transitory computer readable storage medium can store instructions, which when executed by an electronic device comprising processing circuitry, can cause the processing circuitry to perform any of the above methods.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. An electronic device, comprising:
   a touch screen comprising:
     a first region including a plurality of touch electrodes and a second region including an area without electrodes that can detect touch, wherein a first plurality of touch nodes of the touch screen is in the first region and a second plurality of touch nodes is at least partially in the second region; and
   a processing circuitry configured to:
     detect a touch patch on the touch screen;
     in accordance with a determination that the touch patch is in the first region, apply a first algorithm to determine a location of the touch patch within the first region of the touch screen; and
     in accordance with a determination that the touch patch is in the second region, apply a second algorithm, different from the first algorithm, to determine a location of the touch patch within the second region of the touch screen.

2. The electronic device of claim 1, wherein the first algorithm applies a threshold to a first feature computed from a touch image and wherein the second algorithm includes a machine learning model.

3. The electronic device of claim 2, wherein the machine learning model is configured to apply a linear model or a non-linear model to a plurality of features computed from the touch image and from the touch patch.

4. The electronic device of claim 1, wherein the second region is in a same plane as the first region.

5. The electronic device of claim 1, wherein the second region is surrounded by the first region.

6. The electronic device of claim 1, further comprising:
one or more routing traces along a periphery of the second region, wherein the one or more routing traces electrically couple one or more of a first plurality of touch electrode segments in a first of the second plurality of touch nodes to one or more of a second plurality of touch electrode segments in a second of the second plurality of touch nodes.

7. The electronic device of claim 1, wherein:
the first plurality of touch nodes of the touch screen includes a first plurality of touch electrode segments that are configured to sense a touch signal;
the second plurality of touch nodes of the touch screen includes a second plurality of touch electrode segments that are configured to sense a touch signal; and
an area of the second plurality of touch electrode segments of one of the second plurality of touch nodes is smaller than an area of the first plurality of touch electrode segments of one of the first plurality of touch nodes.

8. The electronic device of claim 1, wherein the second algorithm includes as input an output of a segmentation process or one or more features extracted from the output of the segmentation process.

9. The electronic device of claim 8, wherein the one or more extracted features include patch level features.

10. The electronic device of claim 1, wherein the second algorithm includes as input an output of a post-segmentation process or one or more features extracted from the output of the post-segmentation process.

11. The electronic device of claim 10, wherein the second algorithm includes a second feature computed from the output of the post-segmentation process that is not used input for the first algorithm.

12. The electronic device of claim 1, wherein the second algorithm includes a boosted decision tree classifier, a logistic regression classifier, or a support vector machine.

13. The electronic device of claim 1, wherein applying the second algorithm in the second region reduces a rate misclassifying a patch corresponding to a hovering object as a touch compared with the first algorithm.

14. The electronic device of claim 1, wherein applying the second algorithm in the second region reduces a rate of misclassifying a patch corresponding to a touching object as a hover compared with the first algorithm.

15. The electronic device of claim 1, wherein the second region corresponds to an optical sensor.

16. The electronic device of claim 1, wherein the second region is without display pixels.

17. The electronic device of claim 1, the touch screen further comprising a third region including a second area without touch electrodes, wherein the area of the second region is a different size than the second area of the third region, and wherein the second plurality of touch nodes is partially in the second region or at least partially in the third region.

18. The electronic device of claim 1, wherein:
the first plurality of touch nodes of the touch screen includes a first plurality of touch electrodes segments that are configured to sense one or more first touch signals;
the second plurality of touch nodes of the touch screen includes a second plurality of touch electrode segments that are configured to sense one or more second touch signals; and
the one or more first touch signals corresponding to an object touching the first plurality of touch nodes is greater than the one or more second touch signals corresponding to an object touching the second plurality of touch nodes.

19. A non-transitory computer readable storage medium storing one or more programs, the one or more programs comprising instructions, which when executed by one or more processors of an electronic device including a touch screen comprising a first region including a plurality of touch electrodes and a second region including an area without electrodes that can detect touch, cause the electronic device to:
detect a touch patch on the touch screen;
in accordance with a determination that the touch patch is in the first region, apply a first algorithm to determine a location of the touch patch within the first region of the touch screen; and
in accordance with a determination that the touch patch is in the second region, apply a second algorithm including a machine learning model, different from the first algorithm, to determine a location of the touch patch within the second region of the touch screen.

20. The non-transitory computer readable storage medium of claim 19, wherein the first algorithm applies a threshold to a first feature computed from a touch image.

21. The non-transitory computer readable storage medium of claim 20, wherein the machine learning model is configured to apply a linear model or a non-linear model to a plurality of features computed from the touch image and from the touch patch.

22. The non-transitory computer readable storage medium of claim 19, wherein the second region is in a same plane as the first region and the second region is surrounded by the first region.

23. A method comprising:
at an electronic device including one or more processors and a touch screen comprising a first region including a plurality of touch electrodes and a second region including an area without electrodes that can detect touch:
detecting a touch patch on the touch screen;
in accordance with a determination that the touch patch is in the first region, applying a first algorithm to determine a location of the touch patch within the first region of the touch screen; and
in accordance with a determination that the touch patch is in the second region, applying a second algorithm, different from the first algorithm, to determine a location of the touch patch within the second region of the touch screen.

24. The method of claim 23, wherein the first algorithm applies a threshold to a first feature computed from a touch image and wherein the second algorithm includes a machine learning model.

* * * * *